(12) United States Patent
Hamilton

(10) Patent No.: US 10,094,910 B2
(45) Date of Patent: *Oct. 9, 2018

(54) LOCATION ESTIMATION SYSTEM

(71) Applicant: Michael Hamilton, Lewisville, TX (US)

(72) Inventor: Michael Hamilton, Lewisville, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/804,289

(22) Filed: Nov. 6, 2017

(65) Prior Publication Data

US 2018/0067191 A1 Mar. 8, 2018

Related U.S. Application Data

(63) Continuation of application No. 15/183,745, filed on Jun. 15, 2016, now Pat. No. 9,810,767.

(60) Provisional application No. 62/180,596, filed on Jun. 16, 2015, provisional application No. 62/296,109, filed on Feb. 17, 2016.

(51) Int. Cl.
*H04W 4/02* (2018.01)
*G01S 5/14* (2006.01)
*G01S 5/02* (2010.01)

(52) U.S. Cl.
CPC ............ *G01S 5/14* (2013.01); *G01S 5/0242* (2013.01); *G01S 5/0257* (2013.01); *H04W 4/027* (2013.01)

(58) Field of Classification Search
CPC ......... H04W 4/026; H04W 4/027; G01S 5/14; G01S 5/0242; G01S 5/0257; G01S 1/20
See application file for complete search history.

(56) References Cited

U.S. PATENT DOCUMENTS

| | | | |
|---|---|---|---|
| 2008/0234930 A1* | 9/2008 | Cheok | G01S 5/0284 701/408 |
| 2015/0029053 A1* | 1/2015 | Dewberry | G01S 11/02 342/118 |
| 2015/0330780 A1* | 11/2015 | Yuzawa | G01C 5/06 702/150 |
| 2016/0259032 A1* | 9/2016 | Hehn | G01S 5/0289 |

* cited by examiner

*Primary Examiner* — Syed Haider

(57) ABSTRACT

A location estimation system includes a plurality of Kalman filters, a UWB position system, a pressure sensor, a temperature sensor and a MEMs chip that provides gyroscope, accelerometer and magnetometer information. The data is Kalman filtered to determine precise location information that is more precise any sensor that is processed to determine the probably location of a device.

15 Claims, 16 Drawing Sheets

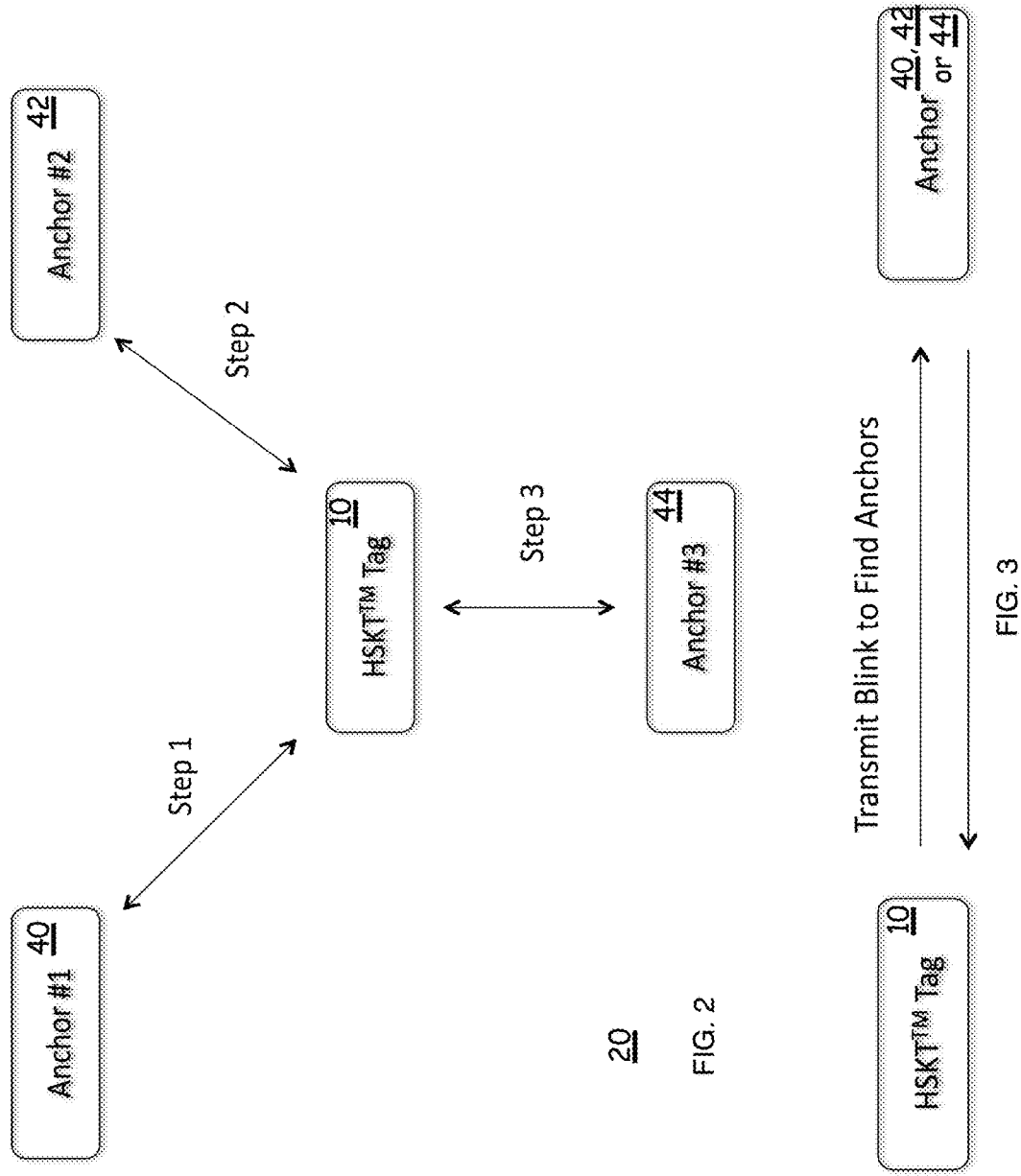

| Channel number | Center frequency (MHz) | Bandwidth (MHz) | Preamble Codes (16 MHz PRF) | Preamble Codes (64 MHz PRF) |
|---|---|---|---|---|
| 1 | 3494.4 | 499.2 | 1, 2 | 9, 10, 11, 12 |
| 2 | 3993.6 | 499.2 | 3, 4 | 9, 10, 11, 12 |
| 3 | 4492.8 | 499.2 | 5, 6 | 9, 10, 11, 12 |
| 4 | 3993.6 | 1331.2* | 7, 8 | 17, 18, 19, 20 |
| 5 | 6489.6 | 499.2 | 3, 4 | 9, 10, 11, 12 |
| 7 | 6489.6 | 1081.6* | 7, 8 | 17, 18, 19, 20 |

Temperature (T) 26

Pressure (P) 24

$h = R * T * \ln(P0/P) / g$
$R = 287.05 \text{ J} / \text{Kg} \, °\text{K}$
$g = 9.80665 \text{ m} / \text{s}^2$

FIG. 8

COMPUTER READABLE MEDIA          200 receive and process in-going communication signals (202)

determine ranging information (204)

generate outgoing communication signals and processing responses (206)

determine time of flight (208)

determine distances to other devices in system (210)

determining a location estimate (212)

Kalman filtering x, y and z coordinates of location estimate (214)

evaluating temperature and/or pressure information to determine altitude (216)

evaluating acceleration information (218)

Kalman filtering the acceleration information to produce linear acceleration info. (220)

adaptive low pass filtering for Kalman filtered x, y and z outputs with linear acceleration information to obtain precise location information (222)

FIG. 18

LOCATION ESTIMATION SYSTEM

CROSS REFERENCE TO RELATED APPLICATIONS

The present U.S. Utility Patent Application claims priority pursuant to 35 U.S.C. § 120 as a continuation of U.S. Utility application Ser. No. 15/183,745, entitled "Location Estimation System", filed Jun. 15, 2016, which claims priority pursuant to 35 U.S.C. § 119(e) to U.S. Provisional Application No. 62/180,596, entitled "Location Estimation System", filed Jun. 16, 2015, and to U.S. Provisional Application No. 62/296,109, entitled "Location Estimation System", filed Feb. 17, 2016, all of which are hereby incorporated herein by reference in their entirety and made part of the present U.S. Utility Patent Application for all purposes.

BACKGROUND

1. Technical Field

The present invention relates to location estimation systems and, more specifically, to location estimation systems that incorporate triangulation techniques to determine a location.

2. Related Art

Location estimation devices exist for all types of sports, navigation, and asset tracking systems. Golf, for example, is well known for having many location estimation devices that utilize GPS and/or telescoping systems in a sometimes-futile attempt to help the golfer place the ball close to the pin. GPS systems are also used for automotive and other outdoor navigational systems. Initially, GPS was developed for military applications. Casual users, such as sailors, were required to use other less accurate technologies such as the sextant or, more recently, Loran to navigate their way across a body of water. Eventually, GPS technology was made accessible to the public but with a reduced accuracy. Recently, however, GPS systems have been allowed to be made public that have sufficiently higher levels of accuracy. The accuracy of a GPS system may be within a few meters of the indicated location. As such, GPS receivers are now common in navigation systems, cell phones, and even watches.

One problem with GPS receivers, however, is that GPS signals that allow the receiver to triangulate the receiver's location often do not reach receivers that are within a structure. As such, other technologies such as accelerometers and magnetometers are used to supplement GPS data to generate estimates of the location in place of the GPS data. Such systems, however, very rapidly become highly inaccurate thereby effectively terminating location estimation functionality after even a short period of time. Generally, a need exists for a location estimation system that maintains positional accuracy even within structures such as office buildings, warehouses and hospitals.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 2 is a block diagram that illustrates an ultra wide-band position determination system.

FIG. 3 is a block diagram that illustrates an ultra wide-band position determination system.

FIG. 8 is a block diagram that illustrates operation of an altitude algorithm according to one embodiment.

FIG. 18 is a functional block diagram of a computer readable media containing computer instructions that defines operational logic for a processor of a location determination tag/processor according to one embodiment.

DETAILED DESCRIPTION OF THE DRAWINGS

Figure 1:
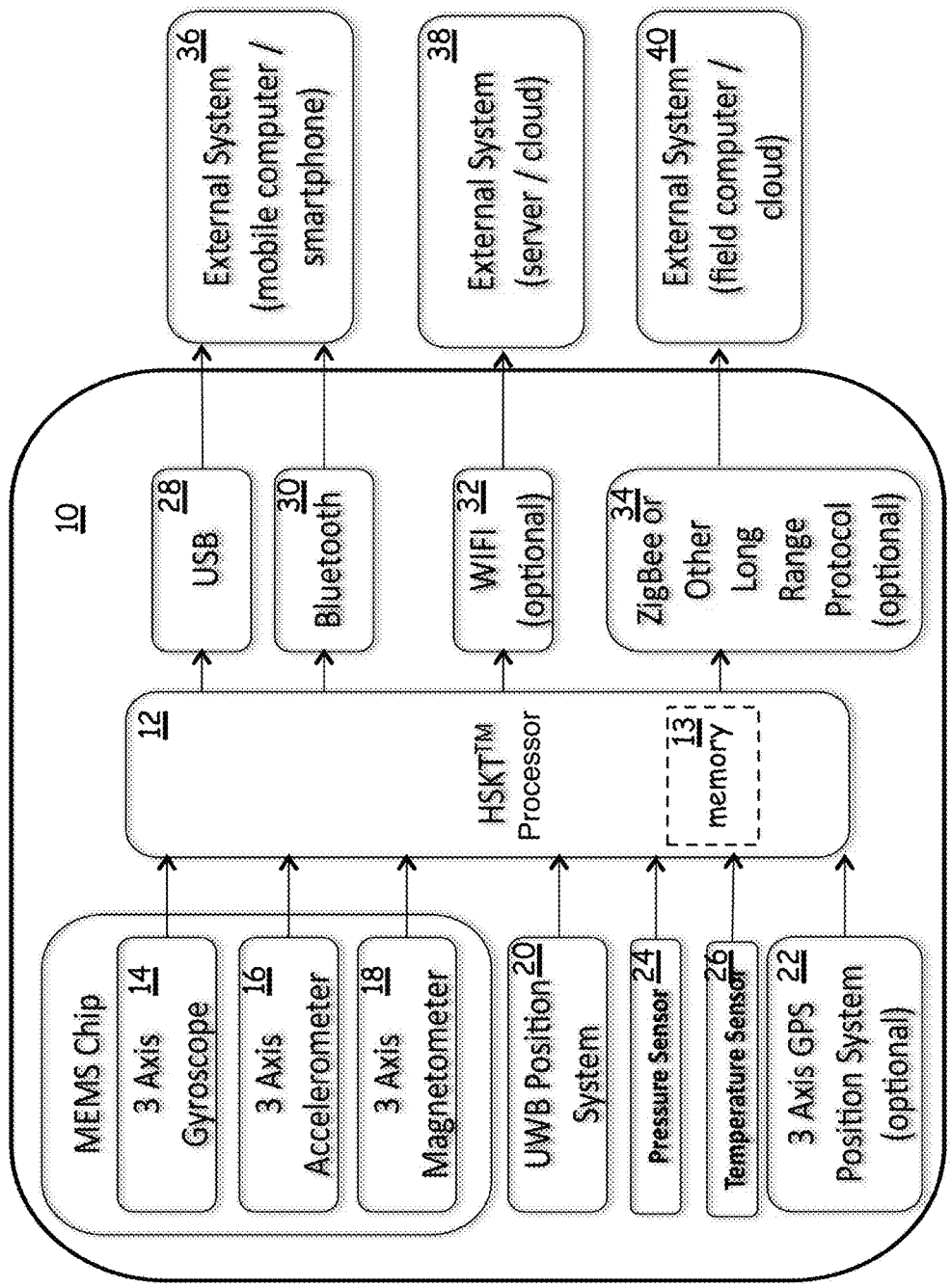
FIG. 1 is a block diagram that illustrates a location determination system according to one embodiment.

FIG. 1 is a block diagram that illustrates a location determination system according to one embodiment. More specifically, FIG. 1 illustrates one embodiment of a high speed Kalman tracking (HSKT™) location determination device 10 that includes a plurality of sensor types whose data is processed by a processor 12 to determine location with a high degree of accurate resolution. Location determination device 10 is referenced herein as a tag/processor device 10. Processor 12 is a general purpose or application specific processor configured to operate as a high speed Kalman tracking device that Kalman filters received data from a plurality of sensors to determine precise location information. A memory 13 is coupled to deliver computer instructions to processor 12 for execution. The computer instructions are configured to cause processor 12 to perform the described functionality including the Kalman filtering of the sensor data to determine precise location information.

The data sensors include a 3-axis gyroscope 14, a 3-axis accelerometer 16 and a 3-axis magnetometer 18. The data from these sensors 14, 16 and 18 are processed by processor 12 along with data from an ultra wide band position system 20, an optional a 3-axis global positioning system (GPS) 22, a pressure sensor 24, and a temperature sensor 26. In at least one embodiment, processor 12 is operable to generate three dimensional location information that is accurate within 1 cm in one embodiment, though no one piece of information from the sensors/systems 14-26 provide data with that level of precision. Processor 12, shown as HSKT, combines the data with multiple Kalman filters at high speed (200 Hz or higher) to give a precise (+−1 mm or better) three-dimensional location estimate in yet another embodiment. In either embodiment, one aspect of device 10 is that the final location information is far more precise that the accuracy of any of the sensors that are coupled to deliver sensor data to processor 12 for Kalman filtering and processing.

Processor 12 includes or is coupled to a memory that includes computer instructions that define the operational steps of processor 12. More specifically, the memory includes computer instructions that, when executed by processor 12 cause processor 12 to operate as described herein including, for example, the Kalman filtering, etc., and more generally, to perform the necessary steps described herein to perform the precise location determination functionality described herein. Once the location estimate is calculated, the values are transmitted out of the system to an external device, if desired, using one of USB 28, Bluetooth 30, Wi-Fi 32 (I.E.E.E. 802.11 (a-n), 802.15, ZigBee 34, or other communication technologies such as cellular communications.

FIG. 2 is a block diagram that illustrates an ultra wideband position determination system in relation to a location determination device. An UWB (ultra wideband) position determination system 20 is configured to enable tag/processor device 10 to determine a precise location as fast as possible. A minimum of 3 anchors 40, 42 and 44 within range of the tag/processor device 10 are required to enable processor 12 of tag/processor device 10 to obtain and determine accurate position information from the UWB system 20. An unlimited number of anchors can be used to improve signal strength and extend the range of the system. If there are more than 3 anchors within range of the tracked HSKT™ tag or processor 12 then the 3 anchors with the best signal quality are chosen for performing triangulation to ascertain a location of processor 12 according to an embodiment.

In each step, the tag/processor device 10 determines a time of arrival (TOA) using a TOA algorithm to determine the distance between the tag or processor 12 and each anchor 40-44. Steps 1-3 are executed one by one and then repeated. This process will be described in greater detail below.

Initially, either the anchor positions are manually measured or determined or a special auto anchor location algorithm is used. Then at each step shown above, a distance from the anchor to the tag is calculated. Once the first three steps are completed, then the trilateration algorithm is started. Then after each new step, the trilateration algorithm is repeated to get the new position. An ultra-wideband signal is used for communications between tag/processor device 10 and each of the anchors.

FIG. 3 is a block diagram that illustrates operation of an ultra-wideband position determination system according to one embodiment. As suggested above, an initial step includes pairing the tag or processor 12 with the three anchors that have the best signal quality (among other factors). To achieve this, processor 12 performs a discovery algorithm to identify all anchors that are present. Thereafter, depending on signal strength as well as relative angles of the anchors in relation to the tag or processor 12, processor 12 of tag/processor device 10 selects which three anchors will be used for subsequent triangulation processing. One reason the relative angles are considered is that if, for example, the three strongest signals were for three angles that are axially aligned while a fourth anchor is located angularly differentiated, using the fourth anchor in place of one of the first three anchors with the best signal strength may allow the processor to more readily or accurately determine its location.

Initially, the tag or processor 12 transmits a blink message on a specific channel and preamble code and then listens to see which anchors are within range of the tag. This blink message is similar to a beacon signal transmitted in some communication protocols. Here, the communication process follows the I.E.E.E. 802.15.4-2011 standard. Each anchor 40-44 has a unique serial number and is set to use a specific channel and preamble code. The tag or processor 10 cycles through the channels and four preamble codes per channel while transmitting each blink message. Once all channels and preamble codes have been tried, a table of available anchors and their signal quality is generated. The processor 12 of tag/processor 10 then selects the three anchors within range that have the best quality signal unless angular differentiation between the anchors may prompt processor 12 to select a different anchor. The tag/processor 10 will continue to communicate with the three selected anchors 40-44 unless the signal quality drops below a minimum threshold at which the discovery process will be repeated. Once three anchors are selected then the TOA (time of arrival) algorithm continues to determine the distance between tag/processor 10 and each of the selected anchors 40-44.

Figures 4, 5:
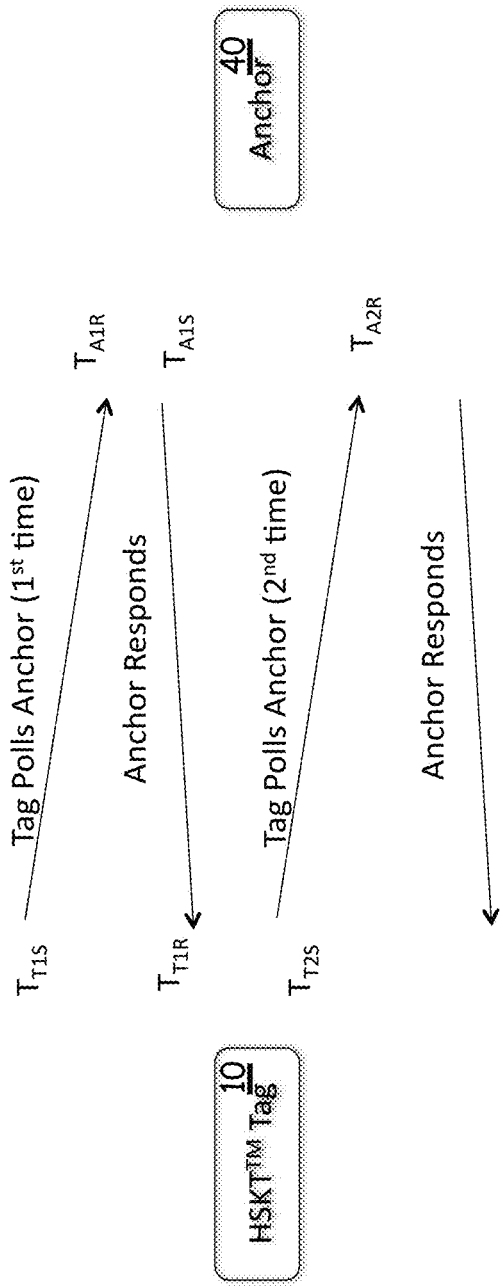
FIG. 4 is a table that illustrates a channel configuration chart according to a communication standard utilized in one embodiment.
FIG. 5 is a block diagram that illustrates TOA (time of arrival) algorithm according to one embodiment.

FIG. 4 is a table that illustrates a channel configuration chart according to a communication standard utilized in one embodiment. The UWB position system uses a radio in the described embodiment that operates according to the I.E.E.E. 802.15.4 (2011) standard. Each anchor will have its own unique serial number and be set to operate on a specific channel with a specific preamble code (at 64 MHz PRF). The tag/processor (e.g., tag/processor 10) switches between the 7 channels and 4 preamble codes shown in the table above to determine which anchors are within range. The tag/processor 10 then builds a table of anchor serial numbers versus signal quality to determine which 3 anchors communicate with to perform triangulation calculations.

FIG. 5 is a block diagram that illustrates a TOA (time of arrival) algorithm according to one embodiment. For the purpose of the example of FIG. 5, tag/processor 10 initially communicates with anchor 40.

A. Initially, the tag/processor 10 sets the preamble code and channel to select an anchor (here, anchor 40) from the three anchors 40-44 selected in the discovery step for a subsequent communication.

B. The tag/processor 10 stores the current timestamp (TT1S) and sends it to the anchor 40 in a $1^{st}$ poll message.

C. The anchor 40 receives the 1st poll message notes current timestamp (TA1R), waits a fixed response time and then notes current timestamp (TA1S) and sends to the tag/processor 10. The tag/processor 10 notes the current timestamp (TT1R), waits a fixed response time and then notes the current timestamp (TT2S) and sends to anchor 40.

D. Anchor 40 notes current timestamp (TA2R), calculates TOF (time of flight) according to the equation shown in FIG. 5 and responds to tag/processor 10. The TOF measured is adjusted by a delay time from an antenna/device calibration table. This adjusts for any delay that can be attributed to a period from when the signal is received at the antenna and when it is processed by the processor 12 of tag/processor 10.

(E) TOF is calculated as follows:

$$TRP1 = T_{T1R} - T_{T1S} \quad (1)$$

$$TRP2 = T_{A2R} - T_{A1S} \quad (2)$$

$$TDLY1 = T_{A1S} - T_{A1R} \quad (3)$$

$$TDLY2 = T_{T2S} - T_{T1R} \quad (4)$$

Accordingly, $$TOF = (TRP1*TRP2 - TDLY1*TDLY2)/(TRP1 + TRP2 + TDLY1 + TDLY2) \quad (5)$$

F. Once the tag/processor 10 has the 2nd response from anchor 40, processor 12 of tag/processor 10 calculates the distance according to the formula:

$$distance = TOF * speed\ of\ light. \quad (6)$$

The raw distance is calculated here as the TOF*speed of light as shown in equation (6). The speed of light comes from a table for light being propagated through air at a current temperature & pressure reading. The temperature and pressure readings from the sensors may be used to select a speed of light value from a table that includes speed of light adjustments in air for temperature and pressure variations.

G. The calculated distance is used as an entry in a look up table to determine a calibration factor. The distance is recalculated according to the formula:

$$calibrated\ distance = calibration\ factor * distance \quad (7)$$

wherein distance is the previously calculated distance and wherein table that adjusts for error that is present based on incident signal level at the antenna.

H. The distance is then saved for a specific anchor serial number.

I. Then tag/processor device 10 then changes the channel and preamble code to match the next anchor and repeats the process until a calibrated distance has been determined for each of the remaining selected anchors 40-44 that, here, are anchors 42-44.

The fixed response times (TA1S-TA1R) and (TT2S-TT1R) are kept as similar and as small as possible to reduce timing variation. An important point is that using these two round trips to eliminate the local clock values in the calculation serves to eliminate differences in the clocks and further avoids the need to synchronize the clocks.

Figure 6:
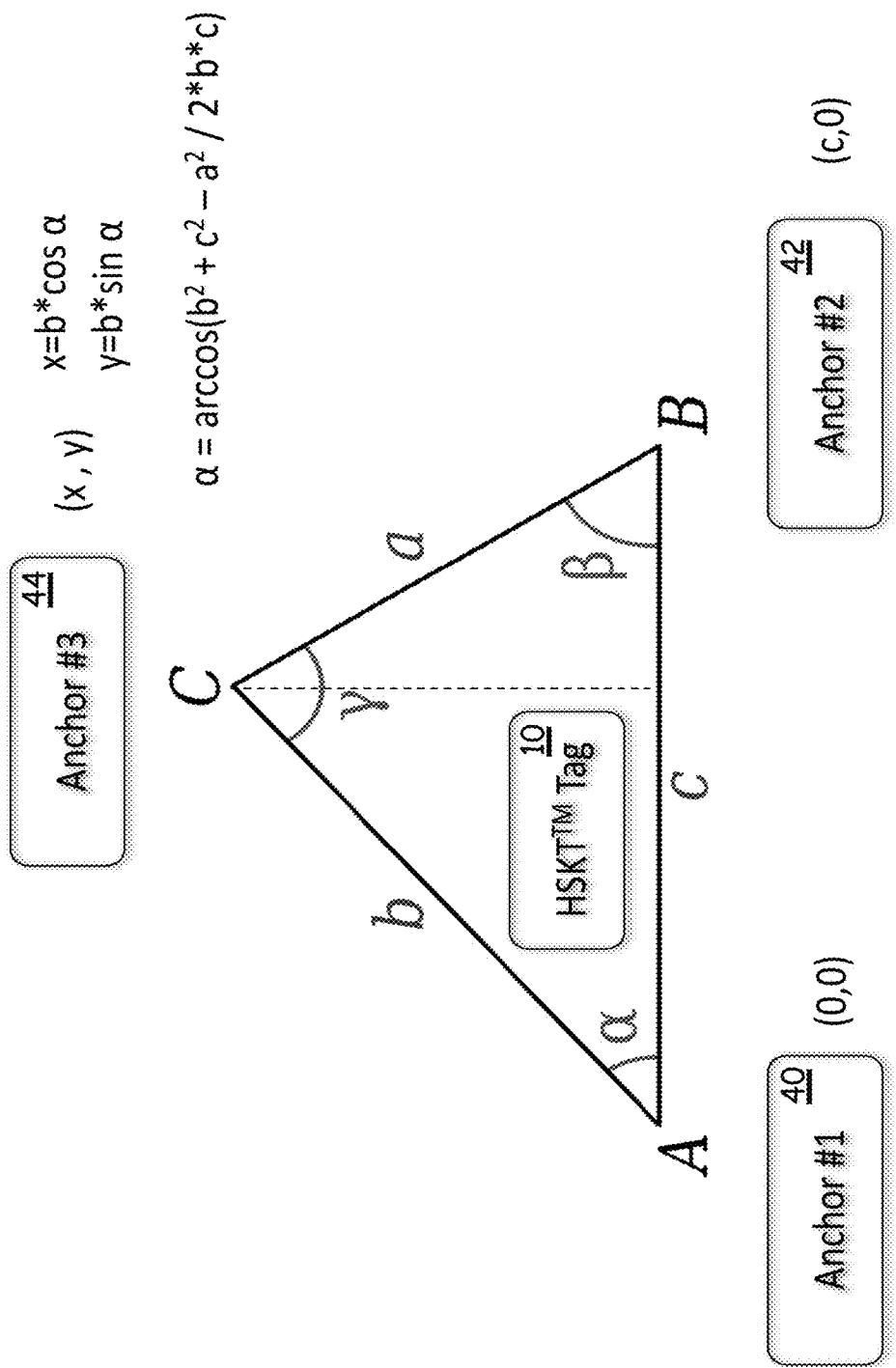
FIG. 6 is a block diagram that illustrates operation of an automatic anchor location determination algorithm by a plurality of anchors according to one embodiment.

FIG. 6 is a block diagram that illustrates operation of an automatic anchor location determination algorithm by a plurality of anchors according to one embodiment. In order for the trilateration algorithm to proceed, the positions of the anchors must be manually measured or the auto anchor location algorithm can be used.

The steps to automatically determine the coordinates of each of the anchors 40-44 is as follows.

J. When the anchors are initially placed in their respective locations, it is assumed they will be placed in a manner similar to what is shown in FIG. 6. For example, here in FIG. 6, they are placed in a triangular configuration about the tag/processor 10. Disposing the anchors 40-44 in this pattern limits the complexity required by the algorithm.

K. The three anchors 40-44 use the TOA algorithm to determine the distance between each other. These distances are embedded into the TOA message and this later allows the tag/processor 10 to determine where the anchors are located.

L. The tag/processor 10 extracts the distances marked a, b and c from the TOA message.

M. Anchor 40 (anchor #1) is assumed to be at position (0,0) in the local coordinate system.

N. Anchor #2 (anchor 42) is assumed to be at position (c,0) in the local coordinate system.

O. The x position for Anchor #3 (anchor 44) is calculated as $x = b * \cos \alpha$. The y position of Anchor #3 is calculated as $y = b * \cos \alpha$. Anchor #3 is then located at (x, y).

If the optional GPS position system 22 is available, then the local coordinates can be converted into global coordinates. This fixes the location to a specific place on the earth's surface. Because the GPS coordinates can vary within the error range or tolerance of GPS systems, processor 12 employs a Kalman filter (by executing the computer instructions in memory 13 in one embodiment) to determine an accurate GPS coordinate that is then used in relation to the UWS based coordinates previously determined as described above.

Figure 7:
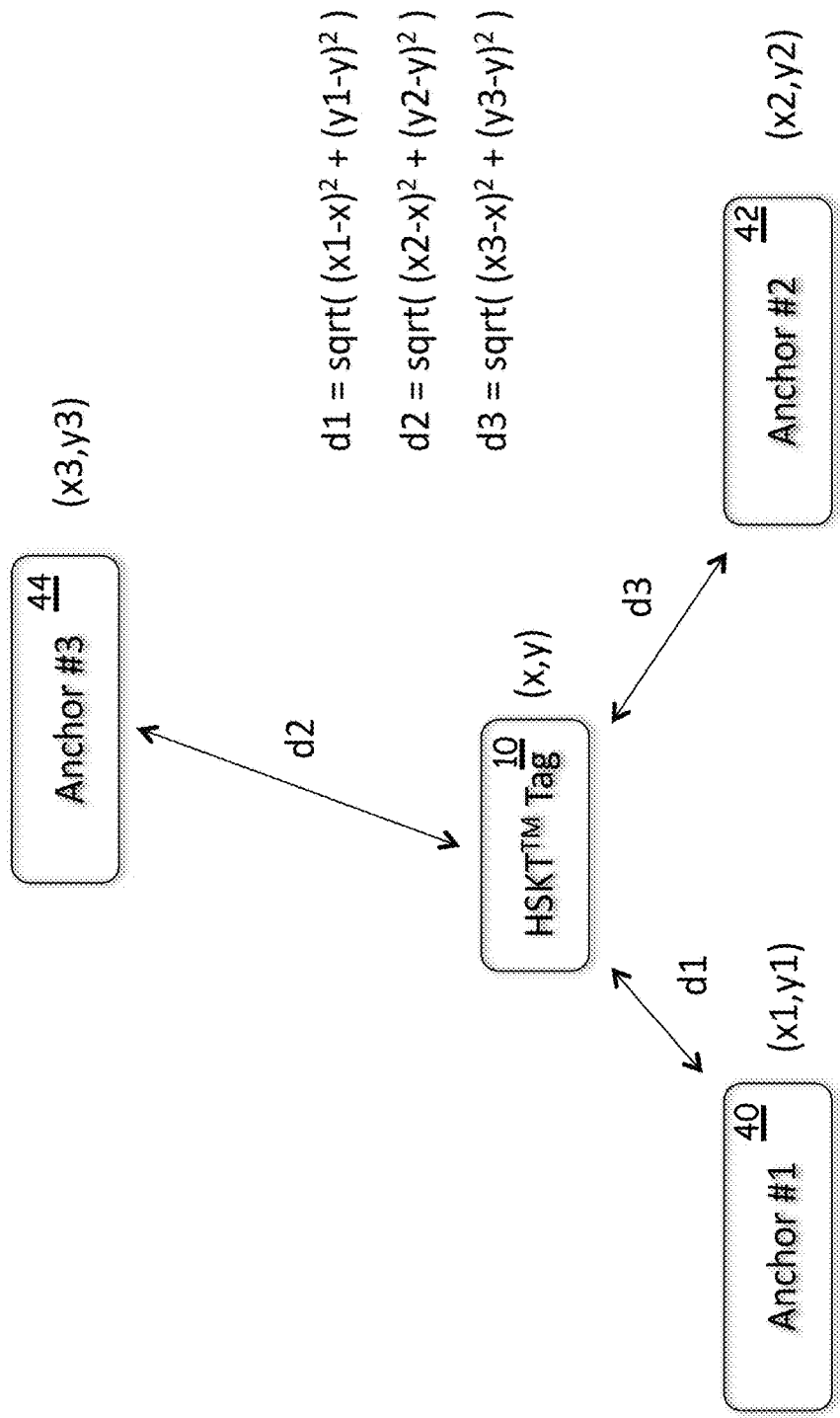
FIG. 7 is a block diagram that illustrates operation of a trilateration algorithm by a plurality of anchors according to one embodiment.

FIG. 7 is a block diagram that illustrates operation of a trilateration algorithm by a plurality of anchors according to one embodiment. The process of determining a position from a set of range measurements is called trilateration. In order to determine the position (x,y) of tag/processor device 10, three non-linear equations have to be solved simultaneously. Initially, a Least Squares approach is used to get a first estimate because it is very fast. Then this estimate is used as a starting point for subsequent calculations using the Newton Method. While the Newton Method gives a more accurate result, but is very time consuming and utilizes more computing resources. Accordingly, using the first estimate with the Least Squares approach speeds up the Newton Method considerably because the combined process brings resolution more promptly. Using the Newton Method is extremely helpful when the tag is outside of the triangle created by the anchors. Using only the Least Squares approach would lead to unacceptable errors.

FIG. 8 is a block diagram that illustrates operation of an altitude algorithm according to one embodiment. The information from precision temperature 26 and pressure 24 sensors are used to determine the relative height of the tag/processor device 10 above the ground. During initialization, a known height is used to calibrate the relative height. Then the change in pressure is constantly used to determine height changes. FIG. 8 illustrates the formula to calculate relative height (h) based on the pressure and temperature indications produced by sensors 24 and 26, respectively.

Figure 9:
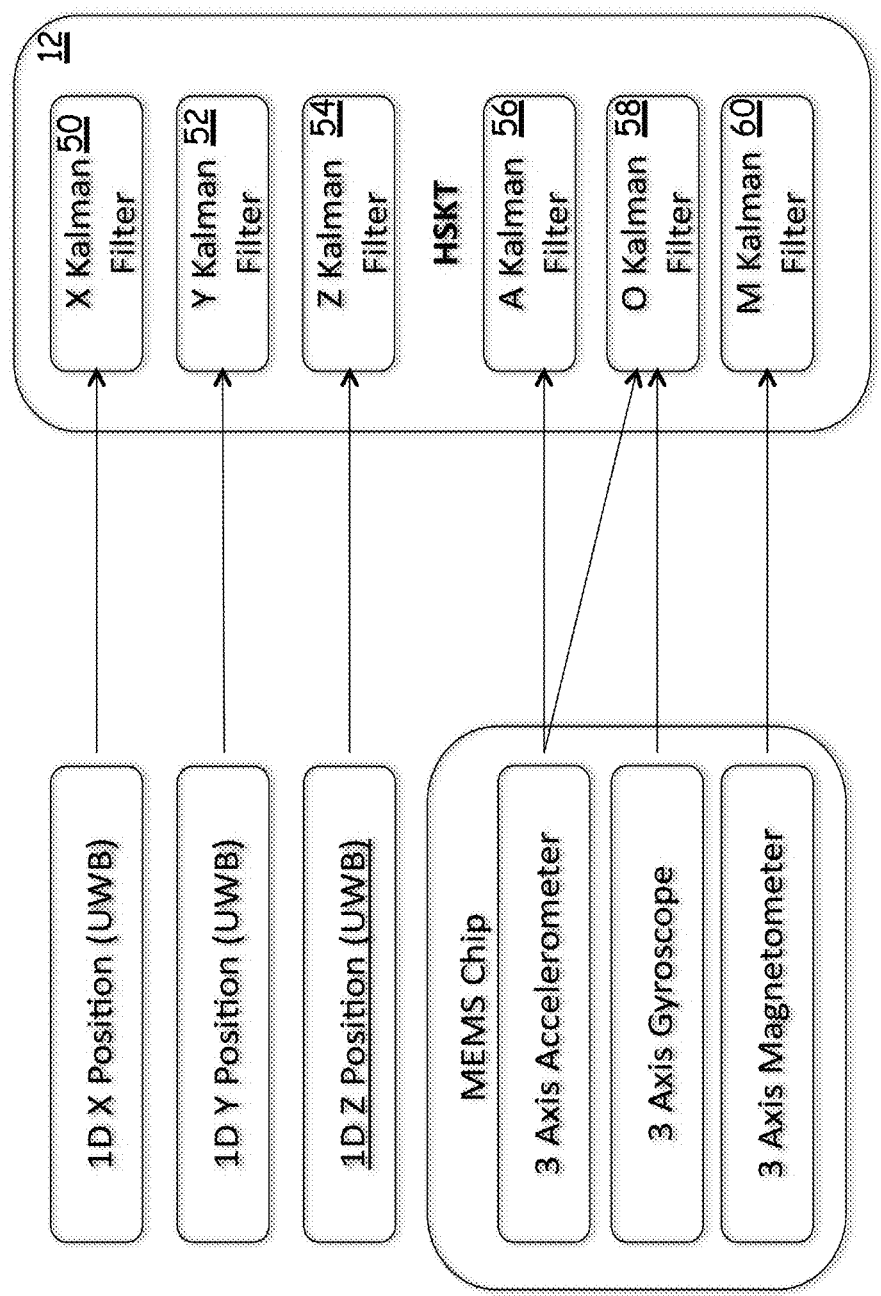
FIG. 9 is a functional block diagram that illustrates a location determination processing block that includes a plurality of Kalman filters according to one embodiment that utilizes the various values derived by circuitry as described above.

FIG. 9 is a functional block diagram that illustrates a location determination processing block that includes a plurality of Kalman filters according to one embodiment that utilizes the various values derived by circuitry as described above.

The HSKT™ Algorithm performed by processor 12 of tag/processor device 10 comprises multiple Kalman filters that are used to combine all the incoming data and/or prior calculations into a very precise absolute position and orientation (attitude). The first three Kalman filters 50, 52 and 54 are used to generate a 3D position (x, y, z) at a 200 Hz (200 times per second) rate or faster. These three filters are configured to be independent to support independent tuning or adjustment of the filters.

Kalman filter 56 is used to estimate the 3D position for very short periods of time in between based on updated X, Y and Z data produced by the Kalman filters 50-54. There are three main reasons for this:

1. Due to the excessive bias and thermal noise of the MEMS accelerometer the position estimate obtained from the accelerometer should only be used for very short periods of time. Otherwise the accumulated error can exceed the precision specification of the system.

2. If the signal quality of any of the anchors drops below a minimum threshold for a brief period of time, then the 3D position estimation from Kalman filter 56 is used instead of the estimate from Kalman filters 50 and 52.

3. If the change in position estimation from Kalman filter 56 is below a specific threshold (broken down by x,y and z axis) then motion is assumed to be stationary on that axis and the change from any of the Kalman filters 50-54 will be ignored.

Kalman filter 58 is used to estimate orientation (attitude) by combining (fusing) the accelerometer and gyroscope data together using these steps:

Q. Accelerometer data is converted to roll and pitch angles and then to quaternion representation.

R. Gyroscope data is converted to quaternion representation.

S. The gyroscope data goes into the state transition matrix and is used to calculate the state estimate.

T. The accelerometer data is used for each new measurement.

U. The new estimated orientation (xhat) is calculated. Kalman filter 60 is used to initialize and periodically calibrate Kalman filter 58. All of the Kalman filters follow these general steps:

Set initial values: xhat0=0, P0=0

V. Mk=ΦkPk−1ΦkT+Qk
(compute error covariance before measurement update)

W. Kk=MkHT(HMkHT+Rk)−1 (compute kalman gain)

X. Xhatk=ΦkXhatk−1+Kk (zk−HΦkXhatk−1) (compute new estimate)

Y. Pk=(I−KkH)Mk
(compute error covariance after measurement update)

xhat=state you are trying to estimate

Φk=[1 Ts; 0 1] (transition matrix example for X and Y Kalman filters)

Qk=[90.3 0; 0 2000] (process noise example for X and Y Kalman filters)

Rk=[900]
(measurement variance for X and Y Kalman filters)

zk=new sensor measurement

H=[1 0]
(measurement transition matrix example for X and Y Kalman filters—only position is measured)

Ts=approximately 16.7 ms (Kalman filter example update time for 60 Hz operation)

It should be understood that the Kalman filters are generated by processor 12 that executes computer instruction that define the steps and logic for generating the Kalman filters in one embodiment. Alternatively, such Kalman filters may be implemented in hardware either by discrete logic, a field programmable gate array, an application specific processor, or any combination thereof. Similarly, any portion of the steps described herein may be similarly implemented as an alternative to a processor executing instructions stored in memory.

Figure 10:
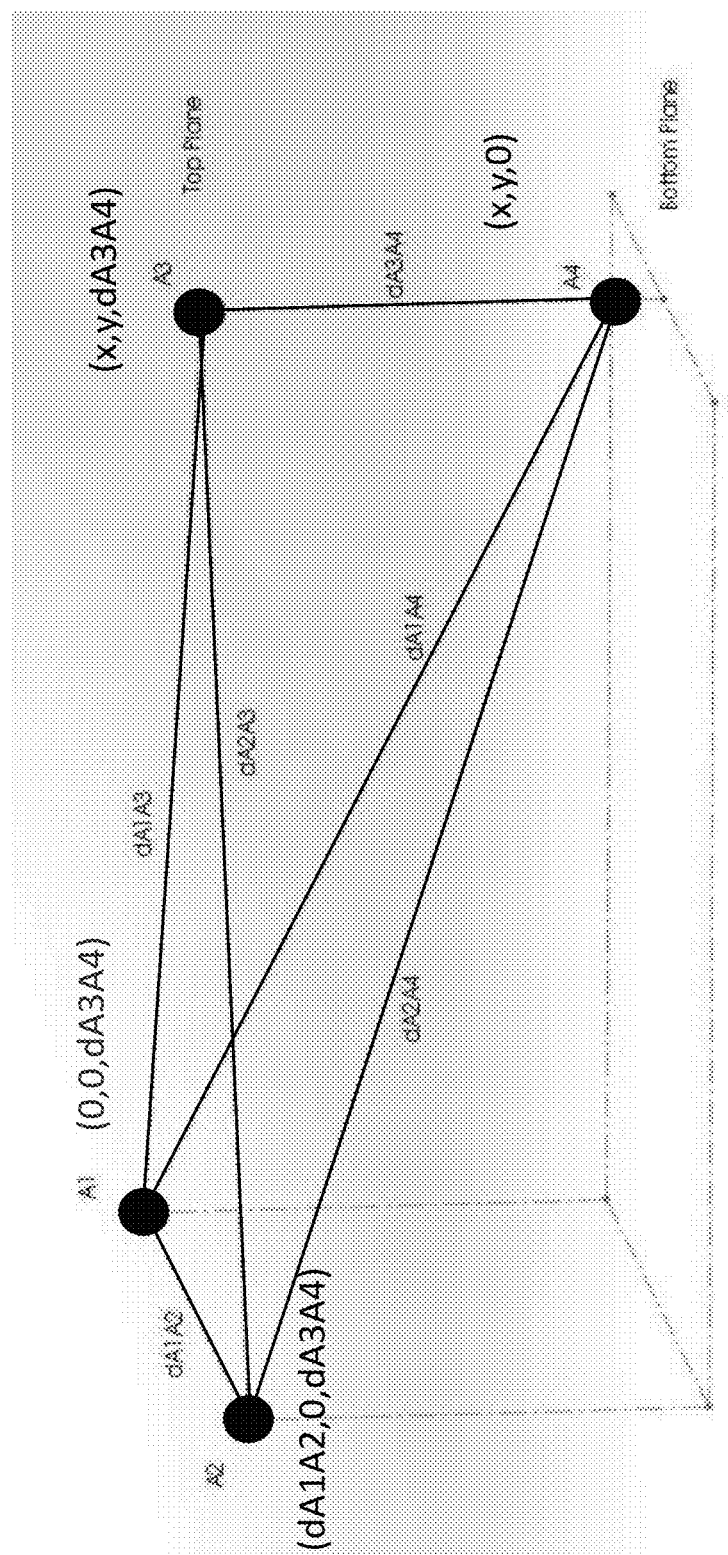
FIG. 10 is a diagram used to illustrate a 3 Dimensional (3D) Auto Anchor Location Algorithm according to one embodiment.

FIG. 10 is a diagram used to illustrate a 3 Dimensional (3D) Auto Anchor Location Algorithm according to one embodiment. The 3D Auto Anchor Location Algorithm proceeds similar to the 2D Auto Anchor Location Algorithm except there is a fourth anchor.

The first three anchors, A1, A2 and A3 are typically placed on the same top plane, but it is not a requirement. The first three anchors x and y coordinates are determined using the 2D Auto Anchor Location Algorithm. The fourth anchor, A4 is typically placed at the same x and y coordinate at anchor A3, but it is not a requirement. The height of the top plane is calculated by measuring dA3A4 using anchors A3 and A4. This height can also be calculated from dA2A4 and dA2A3 where dA3A4=sqrt(dA2A4^2−dA2A3^2). Also dA1A4 and dA1A3 could be used where dA3A4=sqrt(dA1A4^2−dA1A3^2).

Figure 11:
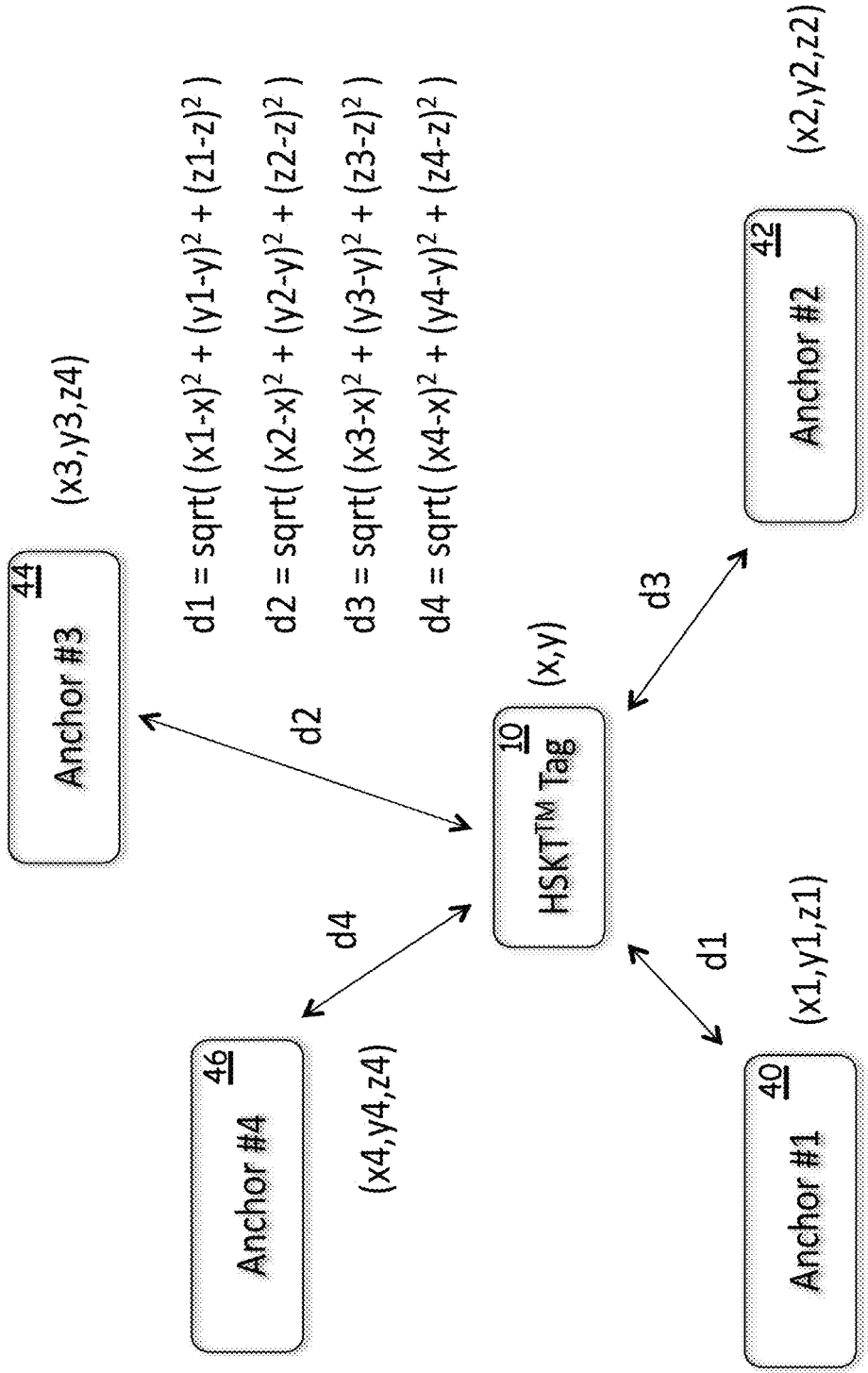
FIG. 11 is a block diagram that illustrates a method for a 3D Trilateration Algorithm.

FIG. 11 is a block diagram that illustrates a method for a 3D Trilateration Algorithm. The process of determining a position from a set of range measurements is called trilateration. In order to determine the tag/processor device 10 position (x,y,z), four non-linear equations have to be solved simultaneously. A Least Squares approach is used to get a first estimate because it is very fast. Then this estimate is used with the Newton Method that gives a more accurate result, but is very time consuming. The first estimate speeds up the Newton Method considerably. Using the Newton Method is extremely helpful when the tag is outside of the triangle created by the anchors. Using only the Least Squares approach would lead to unacceptable errors.

Figure 12:
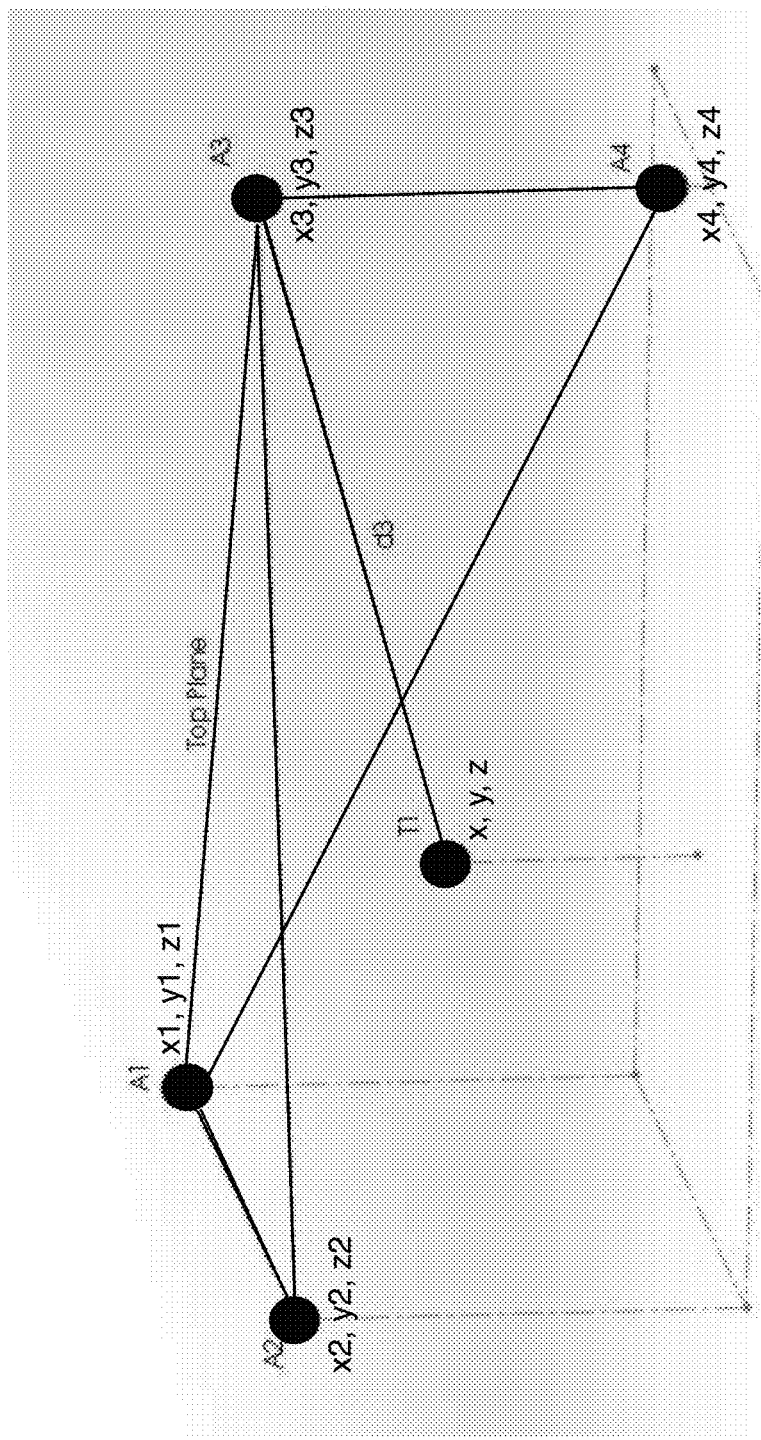
FIG. 12 is a diagram used to illustrate a 3 Dimensional (3D) Trilateration Algorithm according to one embodiment.

FIG. 12 is a diagram used to illustrate operation of a 3 Dimensional (3D) Trilateration Algorithm according to one embodiment. The process of determining a position from a set of range measurements is called trilateration. In order to determine the tag/processor device 10, 3D position (x,y,z), four non-linear equations have to be solved simultaneously as illustrated in FIG. 11. A Least Squares approach is used to get a first estimate because it is very fast. Then this estimate is used with the Newton Method that gives a more accurate result, but is very time consuming. The first estimate speeds up the Newton Method considerably. Using the Newton Method is extremely helpful when the tag is outside of the triangle created by the anchors. Using only the Least Squares approach would lead to unacceptable errors.

Here, four anchors 40, 42, 44 and 46 are being tracked. Accordingly, four non-linear equations shown below are solved to determine x, y and z of the tag. d1 is the distance between tag/processor 10 and anchor 40. D2 is the distance between tag/processor 10 and anchor 42. D3 is the distance between tag/processor 10 and anchor 44. d4 is the distance between tag/processor 10 and anchor 46.

$$d1 = \text{sqrt}((x1-x)2+(y1-y)2+(z1-z)2) \quad (7)$$

$$d2 = \text{sqrt}((x2-x)2+(y2-y)2+(z2-z)2) \quad (8)$$

$$d3 = \text{sqrt}((x3-x)2+(y3-y)2+(z3-z)2) \quad (9)$$

$$d4 = \text{sqrt}((x4-x)2+(y4-y)2+(z4-z)2) \quad (10)$$

Notice anchor 46 is placed at a different elevation than anchors 40-44 in order to get a precise z location of the tag. The elevation difference should cover the range of movement in the z axis of the tag. The system will still work if the tag is outside of the triangle created by anchors 40-44, but the precision will start to decrease as the tag get farther away from the triangle. The tag/processor 10 can also be tracked at an elevation higher than anchor 44 or lower than anchor 46, but the precision will decrease as the tag gets farther away from either anchor's elevation.

Figure 13:
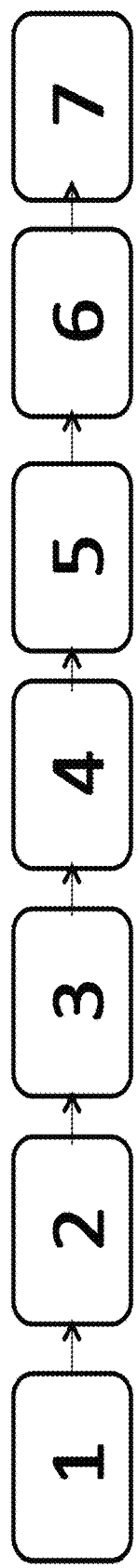
FIG. 13 is a functional block diagram of a system according to one embodiment that illustrates operation.

FIG. 13 is a functional block diagram of a system and method that illustrates operation according to one embodiment.

Block 1 —Anchors are powered ON

When the anchor is first powered ON, it determines which architecture it will be running in and if it is the Master. Next the anchor determines its identity and if any other anchors are ON and which communication channel is being used. Then it waits until the other two anchors are powered ON in a 2D system or when the other three anchors are powered ON in a 3D system.

Block 2 —Auto Calibration (optional)

If auto calibration is selected and all the anchors are powered ON, then A1 determines the distance to A2 and A4 (3D system only). A2 determines distance to A3 and A4 (3D system only). A3 determines distance to A1 and determines distance to A4 (3D system only). All of these distances are stored in the message so each anchor in the chain will know all the previously calculated distances.

A1 then calculates all the coordinates of the other anchors per the Auto Anchor Location Algorithm and sends the coordinates to all the other anchors.

Block 3 —Anchor Listening

If no tags are currently present, then the anchors go into a low power listening mode.

Block 4 —Tag/processor device is powered ON

When the first tag is powered on, it finds out which channel the anchors are using and then it requests their coordinates. In the case of multiple tags using the architecture #2 where the anchor is master, the tag requests which time slot it is supposed to use in a Time Division Multiple Access (TDMA) scheme. In the case of just one tag using architecture #1 then the tag starts with A1 and starts the ranging. It then proceeds to A2, A3 and A4 (3D system). This sequence then continues to repeat.

Block 5 —Ranging Algorithm

Once all the distances have been measured to all the anchors, the ranging algorithm can start as described in the Trilateration Algorithm. Each new distance to a specific anchor is put into an array and then a median filter is run to eliminate any bad measurements.

Block 6 —HSKT™ Algorithm

Each new set of coordinates are fed into the HSKT™ Algorithm to give cm level or greater precision.

Block 7 —Adaptive Acceleration Low Pass Filter (optional)

If higher precision or smoother output is desired, then each set of coordinates from the HSKT™ Algorithm are fed into the Adaptive Acceleration Low Pass Filter.

Adaptive Acceleration Low Pass Filter

The embodiments of the invention may include an Adaptive Acceleration Low Pass Filter to smooth imagery that is displayed that is based on precise location determination information and/or stored imagery related information.

Given:

Linear acceleration in x, y and z (gravity removed).

HR=High range for filter alpha.

LR=Low range for filter alpha.

ratio=Ratio of the amount of acceleration to consider in filter.

alpha=HR−ratio*acceleration_magnitude x=alpha*prev_x+(1−alpha)*x $$R = \begin{bmatrix} 1 - 2q_j^2 - 2q_k^2 & 2(q_i q_j - q_k q_r) & 2(q_i q_k + q_j q_r) \\ 2(q_i q_j + q_k q_r) & 1 - 2q_i^2 - 2q_k^2 & 2(q_j q_k - q_i q_r) \\ 2(q_i q_k - q_j q_r) & 2(q_j q_k + q_i q_r) & 1 - 2q_i^2 - 2q_j^2 \end{bmatrix} \quad (11)$$

Once the x and y (2D) or x, y and z (3D) coordinates have been determined form the HSKT™ algorithm they are then fed into the Adaptive Acceleration Low Pass Filter in order to obtain smooth motion as described below:

AA. Linear acceleration is calculated.

1. Obtain acceleration vector from A Kalman filter a=[ax, ay,az].

2. Obtain normalized orientation quaternion from O Kalman filter q=[q0,q1,q2,q3].

3. Calculate the rotation matrix R using the quaternion from #2 above and the formula shown in the slide above.

4. Calculate transformed gravity vector g'=g*R where g is local gravity vector. g is approximately equal to <0,0,−9.81>

5. Calculate linear acceleration vector a'=a−g'=[lax,lay, laz];

AB. Apply Adaptive Acceleration Low Pass Filter

1. Calculate magnitude of acceleration in the XY plane by mag_xy=sqrt(lax^2+lay^2).

2. Calculate low pass filter alpha_xy=HR−ratio_xy*mag_xy.

a. HR is an adjustable constant. The higher the value the smoother the output, but latency increases. Typical value is 0.99.

b. ratio_xy is an adjustable constant ratio. The higher the value the lower the value of alpha_xy, which in turn decreases the latency and prevents fast motions from being filtered out.

c Clamp the alpha_xy at a minimum value with an adjustable constant LR. This prevents alpha_xy from getting too low and prevents excessive noise from entering the calculation.

d. The new x coordinate is calculated at x=alpha_xy*prev_x+(1−alpha_xy)*x.

e. The new y coordinate is calculated as y=alpha_xy*prev_y+(1−alpha_xy)*y.

f. Calculate magnitude of acceleration in the Z axis by mag_z=abs(laz). Where abs is the absolute function.

g. For the z axis a new low pass filter alpha_z=HR−ratio_z*mag_z is calculated similar to above.

h. Then the new z coordinate is calculated at z=alpha_z*prev_z+(1−alpha_z)*z.

i. Finally previous values are updated for the next iteration.

1. Prev_x=x, prev_y=y, prev_z=z

TOA Master for the Various Embodiments

The Tag/processor 10 is the master using TOA algorithm in many embodiments. This is not a requirement, however. The anchor (anyone of the 3 or 4) may be the master using TOA algorithm in one alternative embodiment. In yet another embodiment, multiple tags are being tracked using TOA algorithm and a time division multiple access (TDMA) scheme.

Figure 14:
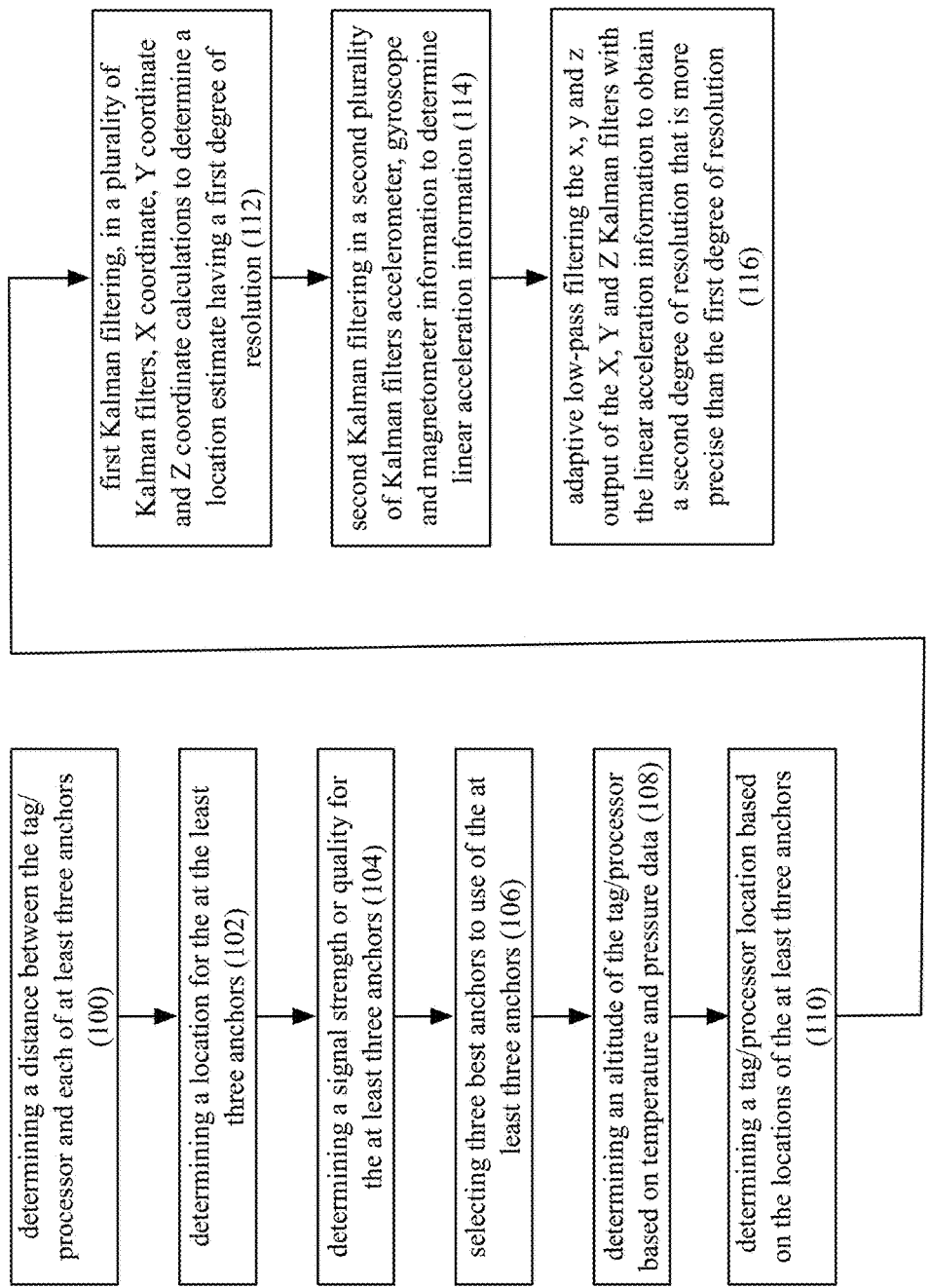
FIG. 14 illustrates a method for estimating a location according to one embodiment of the invention.

FIG. 14 illustrates a method for estimating a location according to one embodiment of the invention. The method includes determining a distance between the tag/processor device and each of at least three anchors (100). The method also includes determining a location for the at the least three anchors (102). In one embodiment, determining the location for each anchor includes receive a communication signal from each anchor that specifies its location. Optionally, the method also includes determining a signal strength or quality for the at least three anchors (104). In an embodiment having more than three anchors, the signal strength or quality is used by the tag/processor device to select three anchors that are to be used as a part of the location determination process. Accordingly, if there are more than there anchors, the method includes selecting three best anchors to use of the at least three anchors (106). The method also includes determining a temperature and air pressure of the ambient conditions immediately around the tag/processor device (108). In the described embodiment, the tag/processor device includes temperature and pressure sensors that send temperature and pressure information to the processor of the tag/processor device. Further, the method includes receiving and processing location information with an ultra-wideband radio transceiver.

Once the three anchors are selected, their locations are known, and a distance between the tag/processor device and the three anchors has been determined, and an altitude of the tag/processor device has been determined, the method includes determining a tag/processor device location based on the locations of the at least three anchors as well as at least one of the temperature and pressure information (110).

The initial location information, in terms of X, Y and Z coordinates is then Kalman filtered in first, second and third Kalman filters, respectively, to determine a Kalman filtered location estimate that is more precise than the initial location determination and more precise, in at least one embodiment, than any of the sensor data, the Kalman filtered location estimate having a first degree of resolution (112).

In one embodiment of the invention, the method also includes second Kalman filtering in a second plurality of Kalman filters, accelerometer, gyroscope and magnetometer information (received from a MEMs chip in one embodiment) to determine linear acceleration information (114). Finally, the method includes adaptive low-pass filtering the x, y and z output of the X, Y and Z Kalman filters with the linear acceleration information to obtain a second degree of resolution that is more precise than the first degree of resolution (116).

The method according to one embodiment includes generating an updated location estimate based on updated information for X, Y and Z coordinate information that is based upon updated ultra-wideband (UWB) X position information that has been Kalman filtered for each coordinate. The ranging information or distance is calculated using a time of arrival measurements that are compared to indicated time of transmission information that is indicated by the anchors. In one embodiment, the calculated distance is adjusted with a calibration factor that is based upon the calculated distance to determine an adjusted distance that is determined for each of the anchors in relation to the tag/processor device. A trilateration algorithm is used to determine the location of each anchor and of the tag/processor device. The trilateration algorithm uses at least one of a Least Squares calculation and a Newton Method calculation. In one embodiment, the algorithm uses a Least Squares calculation and subsequently a Newton Method calculation.

In the described embodiment, a Kalman filtering system includes a first Kalman filter for Kalman filtering a first type of coordinate information, a second Kalman filter for Kalman filtering a second type of coordinate information, a third Kalman filter for Kalman filtering a third type of coordinate information and at least one (e.g., a fourth) Kalman filter for Kalman filtering at least one of accelerometer, gyroscope and magnetometer information. In one embodiment, the Kalman filtering system includes the fourth and a fifth Kalman filter wherein the fourth Kalman filter is for Kalman filtering one of said accelerometer and said gyroscope information and wherein the fifth Kalman filter is for Kalman filtering both the accelerometer and gyroscope information. In yet another embodiment, a sixth Kalman filter for Kalman filtering said magnetometer information is included.

This filter and method illustrated herein including, among other figures, is for a system that is operable to track motion within a second degree of resolution that, in one embodiment, is as precise as a millimeter. Such precise information is beneficial for many applications including but not limited to those identified or suggested below at the end of the Detailed Description.

Figure 15:
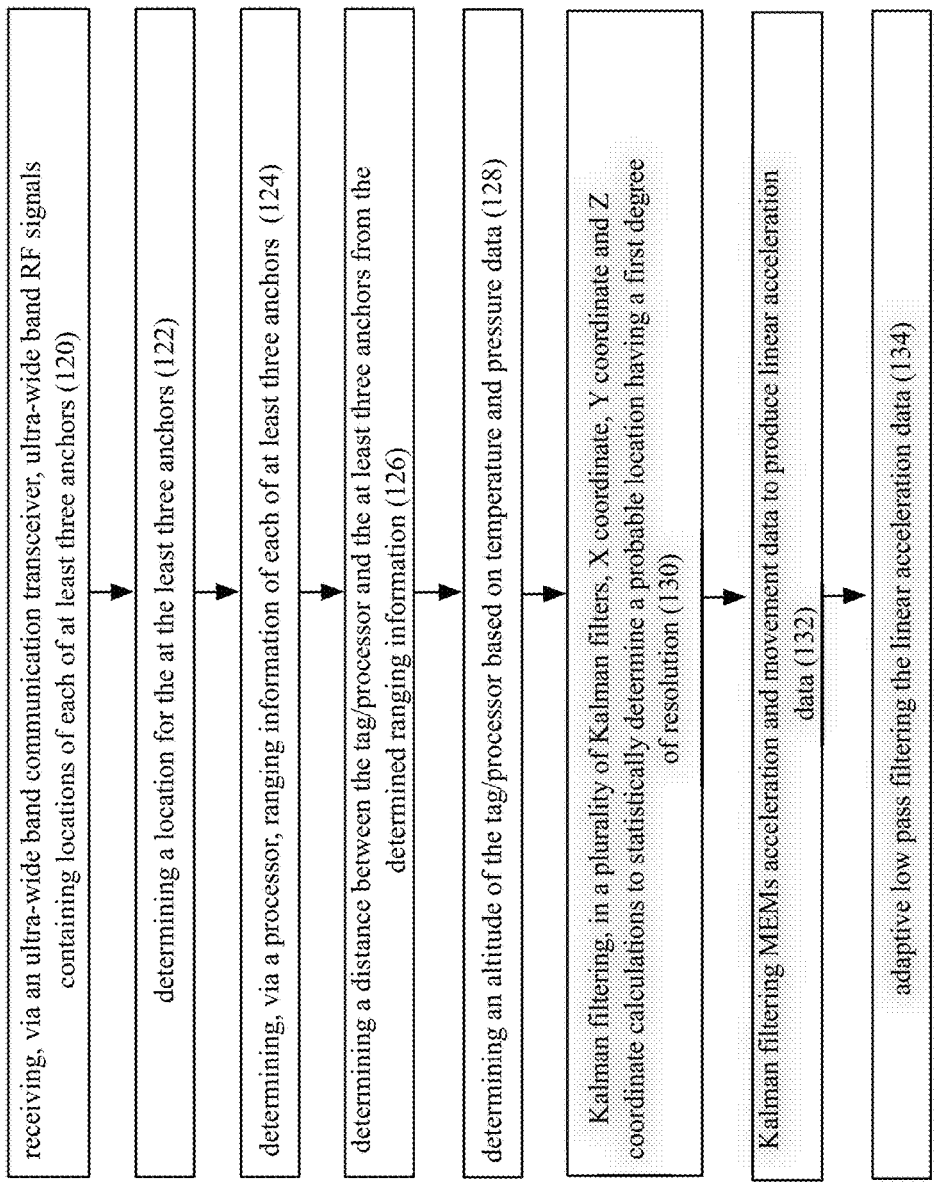
FIG. 15 is a flow chart that illustrates a method for determining a tag/processor device location according to one embodiment.

FIG. 15 is a flow chart that illustrates a method for determining a tag/processor device location according to one embodiment. The method commences with receiving, via an ultra-wide band communication transceiver, ultra-wide band RF signals containing locations of each of at least three anchors (120). Thereafter, the method includes determining, via a processor that processes received communication signals, location information specified within the received communication signals for the at least three anchors (122). The method further includes ranging information of each of at least three anchors by transmitting and receiving ultra-wideband communication messages via the ultra-wide band device and determining an associated transmission time of flight between the tag/processor device and the at least three anchors to determine the ranging information (124). The method also includes determining distances between the tag/processor device and the at least three anchors and storing the determined distances from the determined ranging information (126). As a part of determining the tag/processor device location information, the method further includes determining an altitude of the tag/processor device based upon received pressure and temperature data that are produced by pressure and temperature sensors (128).

The method for determining a location estimate further comprises Kalman filtering, in a plurality of Kalman filters, X coordinate, Y coordinate and Z coordinate calculations from initially determined location information to statistically determine a probable location having a first degree of resolution (130). The method also includes Kalman filtering acceleration and movement data to produce linear acceleration data (132). In one embodiment, such movement data is received from a MEMs chip though such data may be received from other sources as well. Finally, the method includes adaptive low pass filtering the linear acceleration data (134). The outputs of the adaptive low pass filtered linear acceleration data is a second location estimate having a second degree of resolution that is much greater than the first degree of resolution of the initially determined location estimate.

Figure 16:
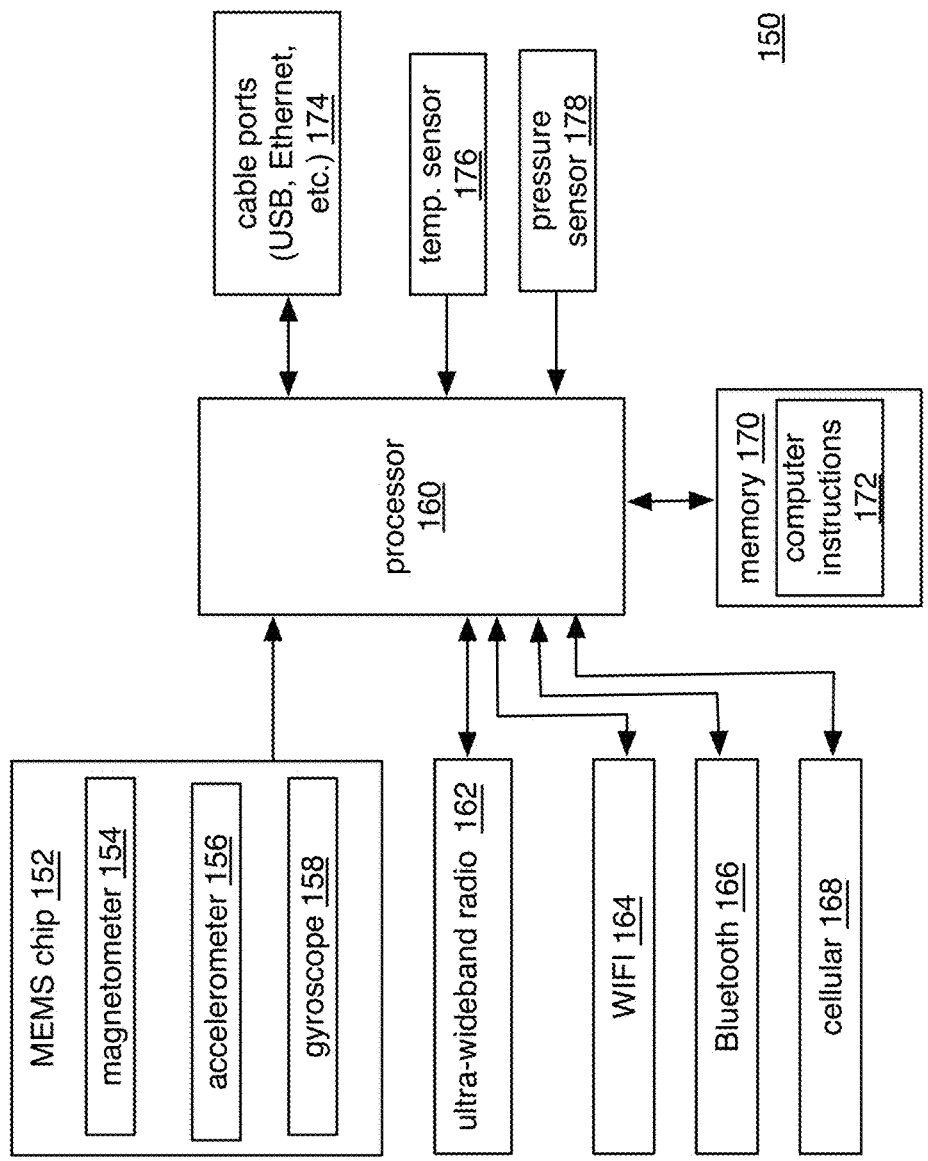
FIG. 16 is a functional block diagram of a tag/processor device according to one embodiment.

FIG. 16 is a functional block diagram of a tag/processor device according to one embodiment. A tag/processor device 150 includes a MEMS chip 152 that further includes a magnetometer 154, an accelerometer 156 and a gyroscope 158. The MEMs chip 152 produces acceleration and movement data to a processor 160. Processor 160 is further coupled to communicate with and via an ultra-wideband radio 162, a Wi-Fi access point (e.g., one that operates according to I.E.E.E. 802.11 protocols, a personal area network access point or devices such as a Bluetooth device 166. Additionally, processor 160 may be configured to communicate with and via a cellular radio that operates according to one or more voice or data cellular radios 168 utilizing associated protocols. Processor 160 is further coupled to a memory 170 that includes computer instructions that, when executed by processor 160, causes processor 160 (and more generally tag/processor device 150) to operate according to the manner described herein throughout the application but especially in relation to the described methods and processes and equivalents therefor. Processor 160 is further connected to a plurality of cable ports 174 that support one or more various types of connectors and communication protocols including but not limited to USB, Ethernet, etc. Finally, processor 160 is configured to receive temperature information from temperature sensor 176 and pressure information from pressure sensor 178.

In operation, processor 160 communicates via ultra-wideband radio 162 to determine precise ranging information from at least three anchors and executes computer instructions 172 to generate a plurality of Kalman filters that Kalman filter the determined triangulated location based on received ranging information to determine a location with a first degree of resolution. Processor 160 also executes computer instructions 172 to generate a second plurality of Kalman filters that Kalman filter MEMS chip data to generate linear acceleration data. Processor 160 further adaptive low pass filters the linear acceleration data to generate a probable location having a second degree of resolution that is much more precise that the first degree of resolution. As an example, in one embodiment, the first degree of resolution is approximately one centimeter and the second degree of resolution is approximately a millimeter.

Figure 17:
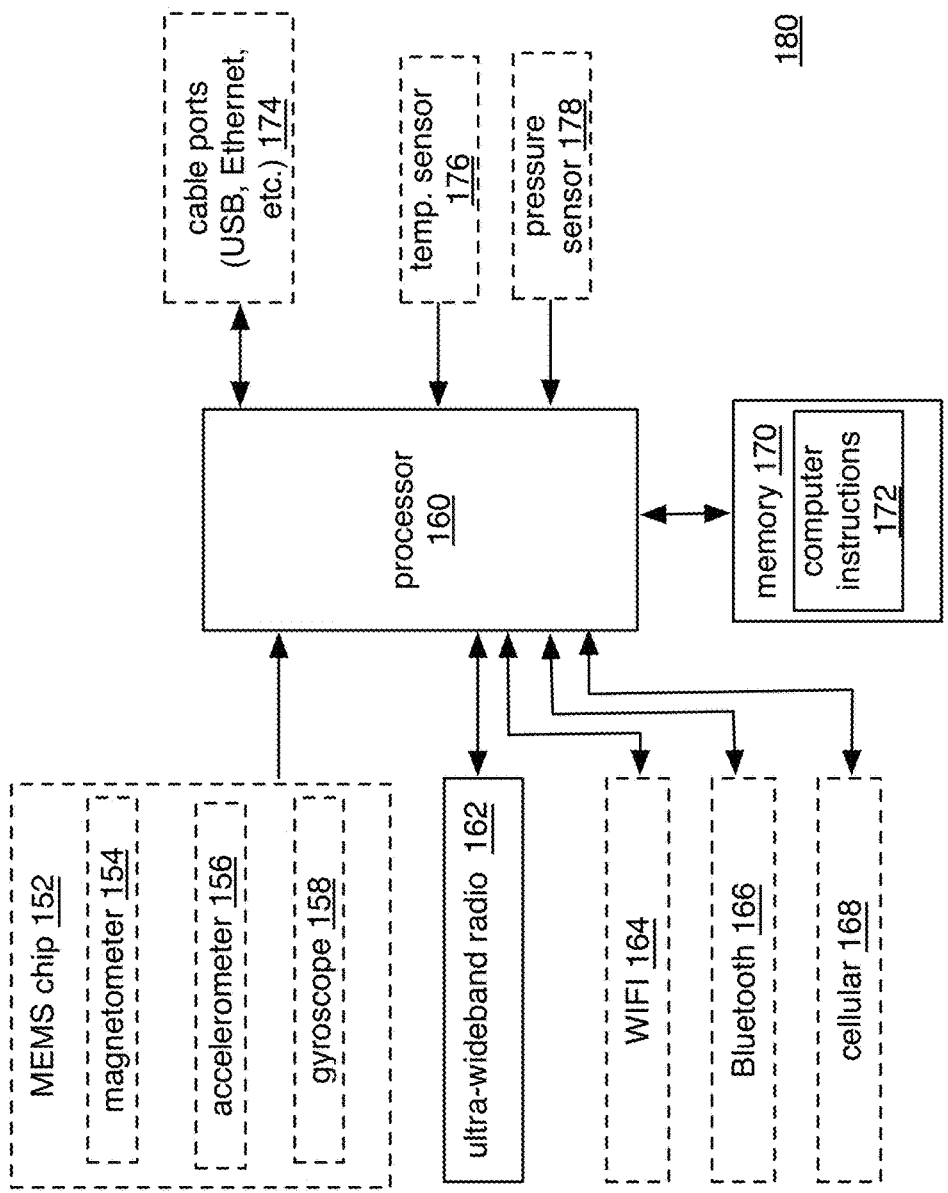
FIG. 17 is a functional block diagram of an anchor in a location determination system that comprises a plurality of anchors and a tag/processor device according to one embodiment.

FIG. 17 is a functional block diagram of an anchor in a location determination system that comprises a plurality of anchors and a tag/processor device according to one embodiment. Many of the components or elements of the anchor in FIG. 17 are similar to those of the tag/processor device of FIG. 16 and are similarly numbered. In one embodiment, the anchors 180 may be substantially the same as the tag/processor devices with the same elements. In the described embodiment, however, the anchors are simplified to reduce complexity, cost and/or power consumption. Because the anchors are, by nature, stationary, such anchors may be utilized that do not include MEMS chip 152, the communication radios such as Wi-Fi 164, Bluetooth 166, or cellular radios 168. Ultra-wideband radio 162 is required, however, to support accurate location determination algorithms, especially those within the tag/processor devices. In one embodiment, anchor 180 also does not include the cable ports 174 or the temperature/pressure sensors 176 and 178. In an alternative embodiment, the temperature and pressures sensors 176 and 178 are included so that the altitude of the anchor may be determined as a part of determining its location coordinates.

In operation, anchor 180 determines its location relative to the other anchors utilizing ranging and triangulation process steps as described herein. More specifically, memory 170 includes the computer instructions 172 to enable processor 160 to perform such calculations when executing the computer instructions 172. In one embodiment, all anchors 180 are disposed at a common altitude to essentially define a horizontal plane. Accordingly, the pressure and altitude data from sensors 176 and 178 are not needed. In an alternative embodiment, the anchors 180 include the pressure and altitude sensors 176 and 178. This embodiment does not require the anchors to be placed at the same altitude.

Another point that may be considered is that the anchors do not calculate location information to the second degree of precision like the tag/processor device does in those embodiments that the anchor does not have the MEMS chip 152. That is acceptable, however, because the anchors are stationary. Accordingly, the tag/processor devices are still capable of determining location information with the second degree of precision (e.g., millimeters) because its movement is relative to the stationary anchors.

FIG. 18 is a functional block diagram of a computer readable media containing computer instructions that defines operational logic for a processor of a location determination tag/processor according to one embodiment. A computer readable media (CRM) 200 includes computer instructions that, when executed by one or more processors, causes the one or more processors to perform the steps of:

receive ingoing digital communication signals from an ultra-wideband radio containing location information from each of a plurality in the location determination system (202);

determine ranging information (204) of each of the plurality of other apparatuses by:
  generating and producing outgoing digital transmission signals and receiving responsive ingoing digital communication signals via the ultra-wideband communication messages (206); and
  determining associated transmission time of flight between the apparatus and the plurality of other apparatuses (208);

determining a distance between the apparatus and the plurality of other apparatuses from the determined ranging information (210); and determining an apparatus location estimate based on the locations and ranging information of the plurality of other apparatuses (212);

Kalman filtering, in a first plurality of Kalman filters, X coordinate, Y coordinate and Z coordinate calculations to statistically determine a probable location having a first degree of resolution (214);

evaluating at least one of temperature and pressure information as a part of determining the probable location (216);

evaluating acceleration information produced by a MEMs device as a part of determining the probable location (218);

defining A and O Kalman filters and for receiving acceleration information from the MEMs device and producing acceleration information to the A and O Kalman and Kalman filtering the acceleration information in the A and O Kalman filters to produce linear acceleration information (220); and combining outputs of the A and O Kalman filters to determine precise location information (222).

It should be understood that the CRM 200 of FIG. 18 may readily include additional or alternative computer instructions to perform any of the steps described throughout this specification and figures. The CRM 200 may be in the form of an optical disk, magnetic media (including magnetic memory devices), memory of a hard disk drive or other storage device, etc. Furthermore, the computer instructions may also be those stored in association with a location determination device as described herein for execution by at least one processor to determine the precise location information.

Applications

The list of applications envisioned by the inventor for accurate position and location determination (PLD) with a high degree of resolution is expansive and includes but is not limited to the following applications:

Virtual Reality (VR)—VR can be defined as being artificial sights and sounds presented to the user by a system in such a way that the user suspends belief and accepts it as a real environment. VR is primarily experienced through the senses of sight and sound. For VR to be effective and to seem real, movement must be smooth. Current VR systems often cause motion sickness because the lack of precise PLD causes motion sickness or, more generally, is uncomfortable. While VR systems can easily be imagined for gaming purposes, the applications are far more expansive. For example, VR systems can be used to give tours of facilities, housing, etc., to facilitate strategic decision-making. A system with the hardware described herein could be combined with a database containing imagery and accurate distance or location information (collectively or individually, "imagery information"). Accordingly, a precise VR system would accurately display views based on the precise location information of the user in relation to overlaid imagery information. This would allow a home buyer, for example, to virtually tour a home to decide whether to actually visit a home that is for sale or even whether to purchase a home of facility yet to be constructed. If a portion of a VR system were to be replaced by a high speed digital processor and software, the embodiment of the invention would include at least one processing core, a memory for holding computer instructions wherein, when executed by the at least one processing core, performs the described and variations thereof for VR.

Augmented Reality (AR)—AR systems are similar to VR systems except that imagery information is displayed and overlaid with actual scenery viewed via a lens wherein the imagery information is sized or scaled and oriented in response to the precise location information of the user. As before, the precise location information of the user allows imagery information to be scaled in smooth manner that is more pleasing and real to a user.

Indoor Laser Tag and other gaming systems—Laser tag systems and other similar gaming systems are similar to the VR systems described above wherein the imagery is displayed in relation to the precise location information of the user as well as the precise location information of the other users. Interestingly, individuals playing laser tag would not be required to be collocated because data transmitted over the Internet could be merged with a VR gaming system to virtually place the users proximate to each other for the game whether the game is laser tag or other game (e.g., racing game, fighting game, etc.). As before the technology may comprise dedicated hardware as described herein, a processor and software based system, or a combination of the two.

Motion Capture—Having precise location information may also be used to capture motion for many applications including remote coaching, gaming, simulated group activities, etc.

Light/Camera and, more generally, equipment tracking—Precise equipment tracking may be had to allow automated and manner equipment collection. With respect to lighting and cameras, precise location tracking may be used to direct lighting and camera equipment in a precise direction for countless applications including for surgical and other medical purposes. Furthermore, precise location and position information may used in conjunction with a guidance system to precisely aim a camera, a lighting system, a laser, a projectile device (e.g., a firearm or other weapon) in addition to knowing the precise target coordinate/position/location.

Speaker Tracking—precise location and position information may used to accurately determine a speaker for purposes of identification, for example, in a large group of people and/or for filming purposes for aiming and zoom calculations for a camera. More generally, precise location and position information may be used within an organization to quickly locate a specific person (e.g., a doctor, nurse or surgeon) or a piece of equipment (a specialized device that is in short supply for any reason including cost).

Fitness Tracking—Fitness trackers are known, but the accuracy of the results are sometimes suspect because of a lack of precise location and position information, especially when indoors. Moreover, accurate motion tracking allows for more precise energy consumption calculations (e.g., calories consumed).

Autonomous Robots/Drones—precise location and position information may used not only to accurately determine a location of an object upon which the robot or drone performs a function but also to accurately determine the location and position of the robot or drone such that the actual relative placements are accurately known. For example, a robotic device in an inventory facility must know its own precise location and position information as well as an inventory item to find and retrieve the item.

Military & Defense—precise location and position information may used in countless applications including training, weapons delivery, targeting etc. For example, helmet mounted sight systems, with precise location and position information may used to slew radar systems and other targeting systems to the precise point that a user or pilot is identifying by the orientation of his helmet. Accordingly, a pilot may more quickly designate a target to release ordnance and subsequently retreat to minimize risk of being shot by enemy systems. Such targeting systems may be for major weapons systems (tanks, ships, bombers and fighter airplanes) as well as personalized weapons systems. In one embodiment, a precise location and position determination system is used with a mobile weapons system that, in one embodiment, may be carried or worn by an individual. Position determination systems may also be used for tracking for teaching purposes (e.g., tracking movement for weapons training, etc.).

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A method performed by a tag/processor device for estimating its probable location, comprising:
  receiving, via an ultra-wide band communication transceiver, ultra-wide band RF signals containing locations of each of at least three anchors;
  determining, via a processor, ranging information of each of at least three anchors by transmitting and receiving ultra-wideband communication messages via the ultra-wide band communication transceiver and determining an associated transmission time of flight between the tag/processor communication transceiver and the at least three anchors;
  determining an altitude of the tag/processor device based on temperature and pressure data;
  determining a distance between the tag/processor device and the at least three anchors from the determined ranging information;
  determining X, Y and Z coordinates based on the determined distances;

Kalman filtering, in a plurality of Kalman filters, the X, Y and Z coordinates to determine a first location estimate having a first degree of resolution to adjust the X, Y and Z coordinates; and adaptive low pass filtering the first location estimate having the first degree of resolution with linear acceleration information to determine a second location estimate having a second degree of resolution for the X, Y and Z coordinates that is greater than the first location estimate.

2. The method of claim 1 further including calculating the associated time of flight for transmissions from each of the at least three anchors by, for each anchor, receiving a transmission time and subtracting the transmission time from a received time.

3. The method of claim 2 further including determining the tag/processor device location estimate by calculating a probably distance between the tag/processor device and the at least three anchors based on the associated time of flight calculations.

4. The method of claim 1 further comprising receiving information from a MEMs device and producing the MEMs information to an A Kalman filter and an O Kalman filter that processes acceleration information and combining outputs of the A and O Kalman filters to determine linear acceleration information.

5. The method of claim 1 further including selecting three best anchors out of the at least three anchors for determining a tag/processor device location based on signal quality of transmissions by each anchor.

6. The method of claim 1 further including determining a pressure reading and temperature as a part of determining the location of the tag/processor device.

7. A tag/processor device in a location determination system, comprising:
an ultra-wideband radio that produces ingoing digital communication signals from received ultra-wideband radio frequency signals;
a processor coupled to receive ingoing digital communication signals from the ultra-wideband radio; and
a memory comprising computer instructions coupled to the processor that, when executed by the processor, causes the processor to perform the steps of:
receiving the ingoing digital communication signals from the ultra-wideband radio containing location information from each of at least three anchors in the location determination system;
determining, via a processor, ranging information of each of the at least three anchors by transmitting and receiving ultra-wideband communication messages via the ultra-wide band radio and determining an associated transmission time of flight between the tag/processor device and the at least three anchors;
determining an altitude of the tag/processor device based on temperature and pressure data;
determining a distance between the tag/processor device and the at least three anchors from the determined ranging information;
determining X, Y and Z coordinates based on the determined distances; and
Kalman filtering, in a plurality of Kalman filters, the X, Y and Z coordinates to determine a first location estimate having a first degree of resolution to adjust the X, Y and Z coordinates; and
adaptive low pass filtering the first location estimate having the first degree of resolution with linear acceleration information to determine a second location estimate having a second degree of resolution for the X, Y and Z coordinates that is greater than the first location estimate.

8. The tag/processor device of claim 7 wherein the tag/processor device is an anchor device.

9. The tag/processor device of claim 7, further including a MEMs device for producing acceleration information wherein determining the location estimate includes evaluating the acceleration information.

10. The tag/processor device of claim 7 wherein the tag/processor device communicates with anchor devices via the ultra-wideband communication device to determine ranging information.

11. The tag/processor device of claim 7, further including a MEMs device and at least one of a pressure sending device and a temperature-sensing device.

12. The tag/processor device of claim 11, at further including a wide-band transceiver for communicating with anchor devices.

13. The tag/processor device of claim 7 further comprising:
a MEMs device; and
computer instructions to prompt the processor to perform the steps of:
receiving information from the MEMs device and producing the MEMs information to an A Kalman filter and an O Kalman filter that process the information from the MEMs device, and
combining outputs of the A and O Kalman filters to determine linear acceleration information.

14. The tag/processor device of claim 7, further comprising:
a pressure sensor configured to produce pressure information to the processor; and
a temperature sensor configured to produce temperature information to the processor.

15. The tag/processor device of claim 14 further comprising computer instructions to prompt the processor to operate as a master anchor and to send coordinate information of the master anchor as well as at least two other anchors a tag/processor device.

* * * * *